US009507082B2

(12) United States Patent
Maruyama et al.

(10) Patent No.: US 9,507,082 B2
(45) Date of Patent: Nov. 29, 2016

(54) TWO-MODE OPTICAL FIBER AND LIGHT TRANSMISSION PATH

(71) Applicant: FUJIKURA LTD., Tokyo (JP)

(72) Inventors: Ryo Maruyama, Sakura (JP); Nobuo Kuwaki, Sakura (JP); Shoichiro Matsuo, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/419,738

(22) PCT Filed: Feb. 5, 2014

(86) PCT No.: PCT/JP2014/052693
§ 371 (c)(1),
(2) Date: Feb. 5, 2015

(87) PCT Pub. No.: WO2014/132763
PCT Pub. Date: Sep. 4, 2014

(65) Prior Publication Data
US 2015/0212265 A1 Jul. 30, 2015

(51) Int. Cl.
*G02B 6/02* (2006.01)
*G02B 6/028* (2006.01)
*G02B 6/036* (2006.01)

(52) U.S. Cl.
CPC ......... *G02B 6/02047* (2013.01); *G02B 6/0281* (2013.01); *G02B 6/02238* (2013.01); *G02B 6/03627* (2013.01)

(58) Field of Classification Search
CPC ................................. G02B 6/02; G02B 6/028

USPC .......................................................... 385/124
See application file for complete search history.

(56) References Cited

U.S. PATENT DOCUMENTS

| 4,877,304 | A | 10/1989 | Bhagavatula | |
|---|---|---|---|---|
| 4,889,404 | A | 12/1989 | Bhagavatula et al. | |
| 2010/0028020 | A1* | 2/2010 | Gholami et al. | 398/159 |
| 2013/0100437 | A1* | 4/2013 | Molin et al. | 356/51 |
| 2014/0029906 | A1* | 1/2014 | Mukasa | 385/126 |

FOREIGN PATENT DOCUMENTS

| EP | 2 674 795 A1 | 12/2013 |
|---|---|---|
| JP | 1-163707 A | 6/1989 |
| JP | 2006-221052 A | 8/2006 |

(Continued)

OTHER PUBLICATIONS

Office Action dated Jul. 7, 2015 issued in counterpart Japanese application No. 2013-041253 (w/English translation) (5 pages).

(Continued)

*Primary Examiner* — Kaveh C Kianni
(74) *Attorney, Agent, or Firm* — Westerman, Hattori, Daniels & Adrian, LLP

(57) ABSTRACT

Optical fibers Fp, Fn, included in a light transmission path, are two-mode optical fibers for propagating an LP01 mode component and an LP11 mode component contained in signal light, and a gradient $d\Delta\tau/d\lambda$ of a mode dispersion $\Delta\tau$ with respect to a wavelength $\lambda$ in a wavelength band of 1530 nm to 1625 nm is $|0.5|$ ps/km/nm or less. Symbols of mode dispersions $\Delta\tau$ of the optical fibers Fp, Fn are opposite to each other. The light transmission path can satisfactorily compensate the mode dispersion in a wide wavelength band.

4 Claims, 16 Drawing Sheets

(56) References Cited

FOREIGN PATENT DOCUMENTS

WO  2012/108467 A1  8/2012
WO  2013/126254 A1  8/2013

OTHER PUBLICATIONS

Extended European Search Report dated Jun. 16, 2015, issued in counterpart application No. 14757019.6 (7 pages).
Ming-Jun Li, et al., "Low Delay and Large Effective Area Few-Mode Fibers for Mode-Division Mulitplexing" Opto-Electronics and Communciations Conference, Jul. 2, 2012, pp. 495-496.
Office Action dated Apr. 21, 2015, issued in corresponding Japanese application No. 2013-041253 (with English Translation) (10 pages).
Cohen et al., "Propagation Characteristics of Double-Mode Fibers", The Bell System Technical Journal, vol. 59, No. 6, Jul.-Aug. 1980; pp. 1061-1072.
Sakamoto et al., "Differential Mode Delay Managed Transmission Line for Wide-band WDM-MIMO System", OFC/NFOEC Technical Digest, OM2D.1, Mar. 4, 2012, pp. 1-3.
Maruyama et al., "DMD Free Transmission Line Composed of TMFs with Large Effective Area for MIMO Processing", ECOC Technical Digest, Tu.1.F.2, Sep. 16, 2012, pp. 1-3.
Maruyama et al., "A Study on Design of Two-Mode Optical Fiber for Bundle Transmission", 2011 Nen IEICE Communications Society Conference Koen Ronbunshu 2, Aug. 30, 2011, p. 235.
International Search Report dated Mar. 4, 2014 issued in corresponding application No. PCT/JP2014/052693.

* cited by examiner

FIG. 15 --Related Art--

| FIBER TYPE | Δ⁺ [%] | α | a [μm] | R_d | R_a | T |
|---|---|---|---|---|---|---|
| NO TRENCH | 0.35 | 1.8 | 12.8 | — | — | 4.27 |
| TRENCH | 0.35 | 1.8 | 16.8 | 1.0 | 0.8 | 4.35 |

FIG. 16 --Related Art--
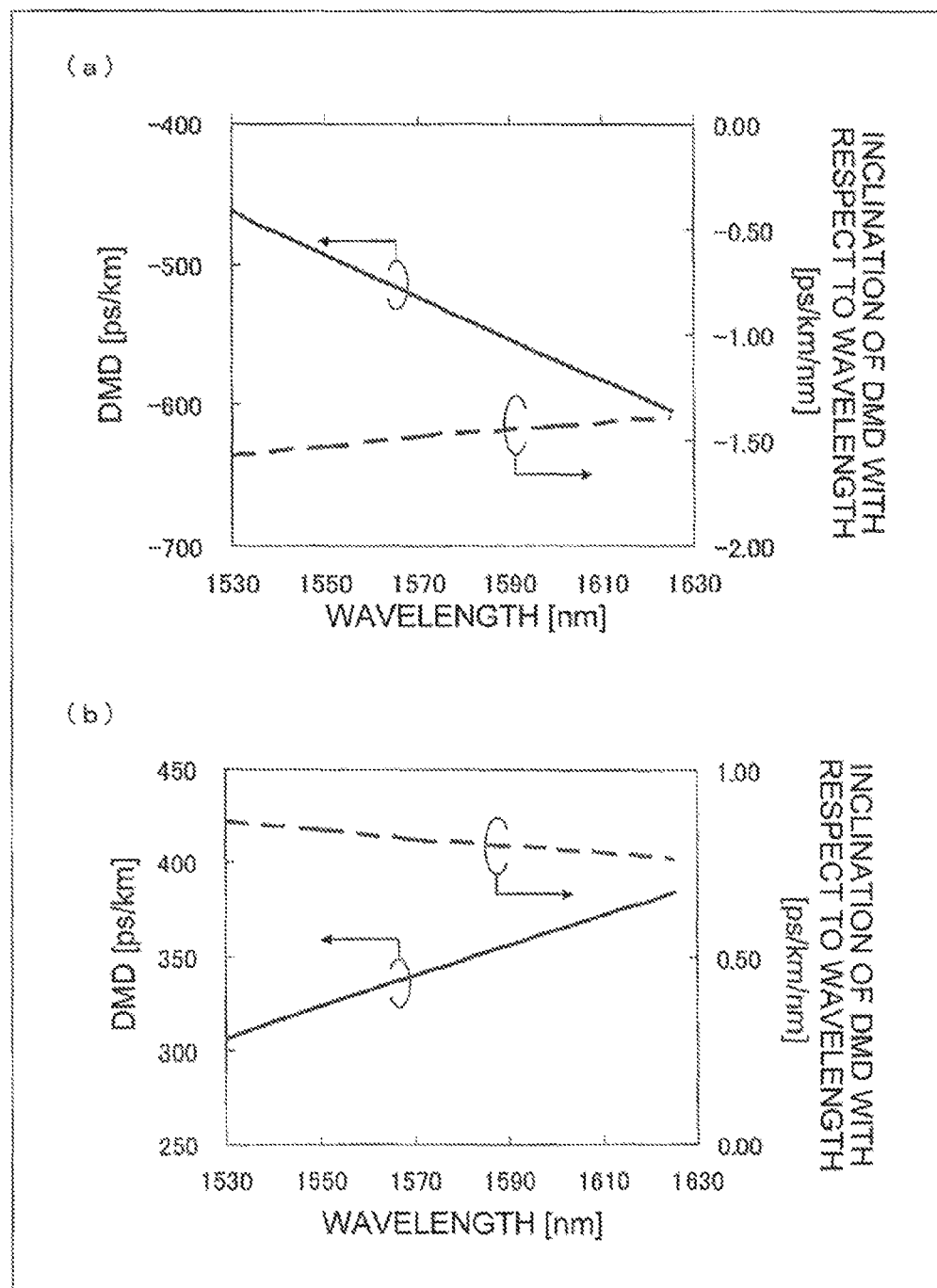

FIG. 17 --Related Art--
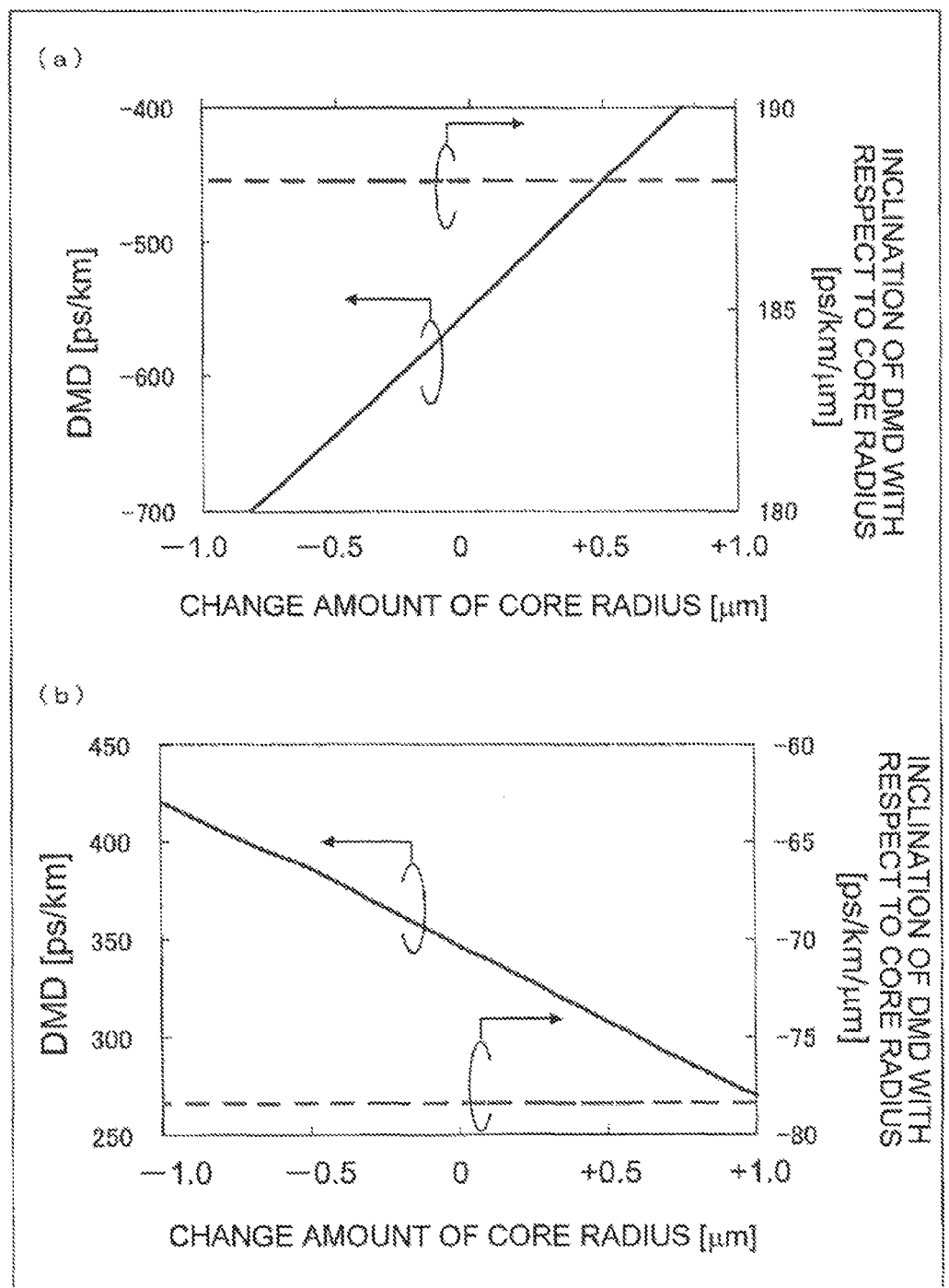

FIG. 18 --Related Art--
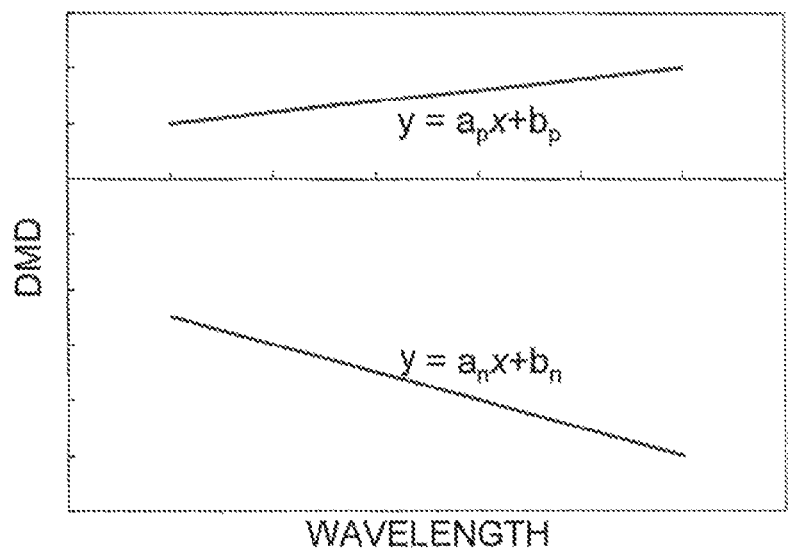

TWO-MODE OPTICAL FIBER AND LIGHT TRANSMISSION PATH

TECHNICAL FIELD

The present invention relates to an optical fiber and a light transmission path.

BACKGROUND ART

In optical information communication, optical fibers which serve as transmission media have been required to have larger transmission capacity as communications traffic increases. Particularly, a long-distance transmission optical fiber employing wavelength division multiplexing (WDM) has been keenly required to meet such requirement. Further, it is predicted that the communications traffic will continue to increase. Therefore, increase in the transmission capacity of the optical fibers is an urgent object to be attained.

In view of the circumstances, in recent years, in order to deal with the increase in the transmission capacity, there has been focused MDM (Mode Division Multiplexing) transmission that multiplexes a plurality of signals with use of an FMF (Few-Mode Fiber) capable of propagating a plurality of modes by superposing signals corresponding to each mode.

However, a mode dispersion inevitably occurs in the FMF. The mode dispersion reduces a transmission capacity in proportion to a transmission distance. It is therefore important to prevent the mode dispersion so as to manufacture a multimode fiber which can carry out a long-distance transmission with a large transmission capacity.

For example, it is known that a processing computational quantity of MIMO (Multiple-Input-Multiple-Output) employable in the MDM transmission is increased as a mode dispersion of the FMF is larger. Therefore, in a case where the mode dispersion of the FMF is large, processing of the MIMO may be delayed. As such, in the MDM transmission, an FMF having a small mode dispersion is needed. Further, because the MDM transmission is supposed to be used together with a WDM transmission, it is necessary to reduce a mode dispersion in a wide wavelength band.

In view of the circumstances, there is proposed a technique for compensating a mode dispersion in a light transmission path by combining a plurality of optical fibers having different mode dispersion characteristics. For example, the following Patent Literature 1 discloses a technique for expanding a transmission band width by compensating a mode dispersion not only in an optimized wavelength (e.g., 0.85 μm) but also in another wavelength (e.g., 1.3 μm) by combining two MMFs (Multimode Fibers).

The following Non-Patent Literatures 1, 2 disclose techniques for reducing a mode dispersion in a wider wavelength band by connecting two or more two-mode fibers in which symbols of mode dispersions and symbols of gradients of mode dispersions with respect to wavelengths are different from each other/one another.

In particular, the following Non-Patent Literature 1 proposes a light transmission path in which (i) a two-mode fiber obtained by applying a trench structure to a graded index core and (ii) a two-mode fiber only having a graded index core are connected to each other, and discloses that a mode dispersion having several ps/km or less can be achieved with use of the light transmission path in a C+L-band which is a wavelength band for optical transmission.

The following Non-Patent Literature 2 proposes a two-mode optical fiber having a stepwise refractive index distribution, and discloses that a light transmission path in which four optical fibers having respective adjusted parameters are connected to one another is used to achieve a mode dispersion having several ps/km or less in a C+L-band.

CITATION LIST

Patent Literature

Patent Literature 1: Japanese Patent Application Publication Tokukai No. 2006-221052 (Publication date: Aug. 24, 2006)

Non-Patent Literature

Non-Patent Literature 1: Ryo Maruyama, et al, "DMD Free Transmission Line Composed of TMFs with Large Effective Area for MIMO Processing", ECOC2012, Tu.1.F.2 (2012/6/16)

Non-Patent Literature 2: Taiji Sakamoto, et al, "Differential Mode Delay Managed Transmission Line for Wide-band WDM-MIMO System", OFC 2012, OM2D.1 (2012/3/4)

SUMMARY OF INVENTION

Technical Problem

However, even if the techniques of Non-Patent Literatures 1, 2 are used, it is still not easy to satisfactorily compensate a mode dispersion in a wide wavelength band. This is because a conventional two-mode optical fiber has such a characteristic that a mode dispersion $\Delta\tau$ thereof has a gradient with respect to a wavelength $\lambda$, i.e., such a characteristic that the mode dispersion $\Delta\tau$ depends on the wavelength $\lambda$. This point will be described with reference to FIG. 18 more specifically. FIG. 18 is a graph showing a mode dispersion characteristic of a conventional optical fiber (an x axis indicates a wavelength and a y axis indicates a mode dispersion). As shown in FIG. 18, a positive mode dispersion $\Delta\tau p$ can be approximate to a linear function $y=apx+bp$ ($ap>0$) and a negative mode dispersion $\Delta\tau n$ can be approximate to a linear function $y=anx+bn$ ($an<0$).

Therefore, in a conventional light transmission path (e.g., light transmission paths disclosed in Non-Patent Literatures 1, 2), even if two two-mode optical fibers (a two-mode optical fiber having a positive mode dispersion $\Delta\tau p$ and a two-mode optical fiber having a negative mode dispersion $\Delta\tau n$) are combined to compensate a mode dispersion based on a wavelength $\lambda$, it is not easy to satisfactorily compensate a mode dispersion of signal light having another wavelength $\lambda$. Accordingly, in a conventional light transmission path, a mode dispersion could not have been satisfactorily compensated in a wide wavelength band.

According to knowledge of the inventors regarding the problem, even in a conventional light transmission path, it is possible to compensate a mode dispersion $\Delta\tau$ in a wide wavelength band by satisfying the following mathematical formula (1). In the mode dispersion $\Delta\tau$, however, a gradient with respect to the wavelength $\lambda$ is insensitive to change in core radius, whereas a value thereof is sensitive to the change in core radius. Therefore, in a case where the core radius is changed, a relationship of the following mathematical formula (1) is largely broken. As such, an object to achieve a light transmission path capable of satisfactorily compensating a mode dispersion in a wide wavelength band.

[Math. 1]

$$\frac{|a_p|}{|a_n|} = \frac{|b_p|}{|b_n|} \quad (1)$$

The present invention has been made in view of the above problem on the basis of further finding by the inventors, and an object of the present invention is to achieve an optical fiber and a light transmission path each of which is capable of satisfactorily compensating a mode dispersion in a wide wavelength band.

Solution to Problem

In order to achieve the object, in an optical fiber according to an embodiment of the present invention, which is a two-mode optical fiber for propagating an LP01 mode component and an LP11 mode component included in signal light, wherein a mode dispersion Δτ defined by the following mathematical formula (2) is constant in a predetermined wavelength band. In the mathematical formula (2) below, vg11 represents a group velocity of the LP11 mode component and vg01 represents a group velocity of the LP01 mode component.

[Math. 2]

$$\Delta\tau = \frac{1}{v_g 11} - \frac{1}{v_g 01} \quad (2)$$

Advantageous Effects of Invention

The present invention can achieve an optical fiber and a light transmission path each of which is capable of satisfactorily compensating a mode dispersion in a wide wavelength band.

Figure 9:
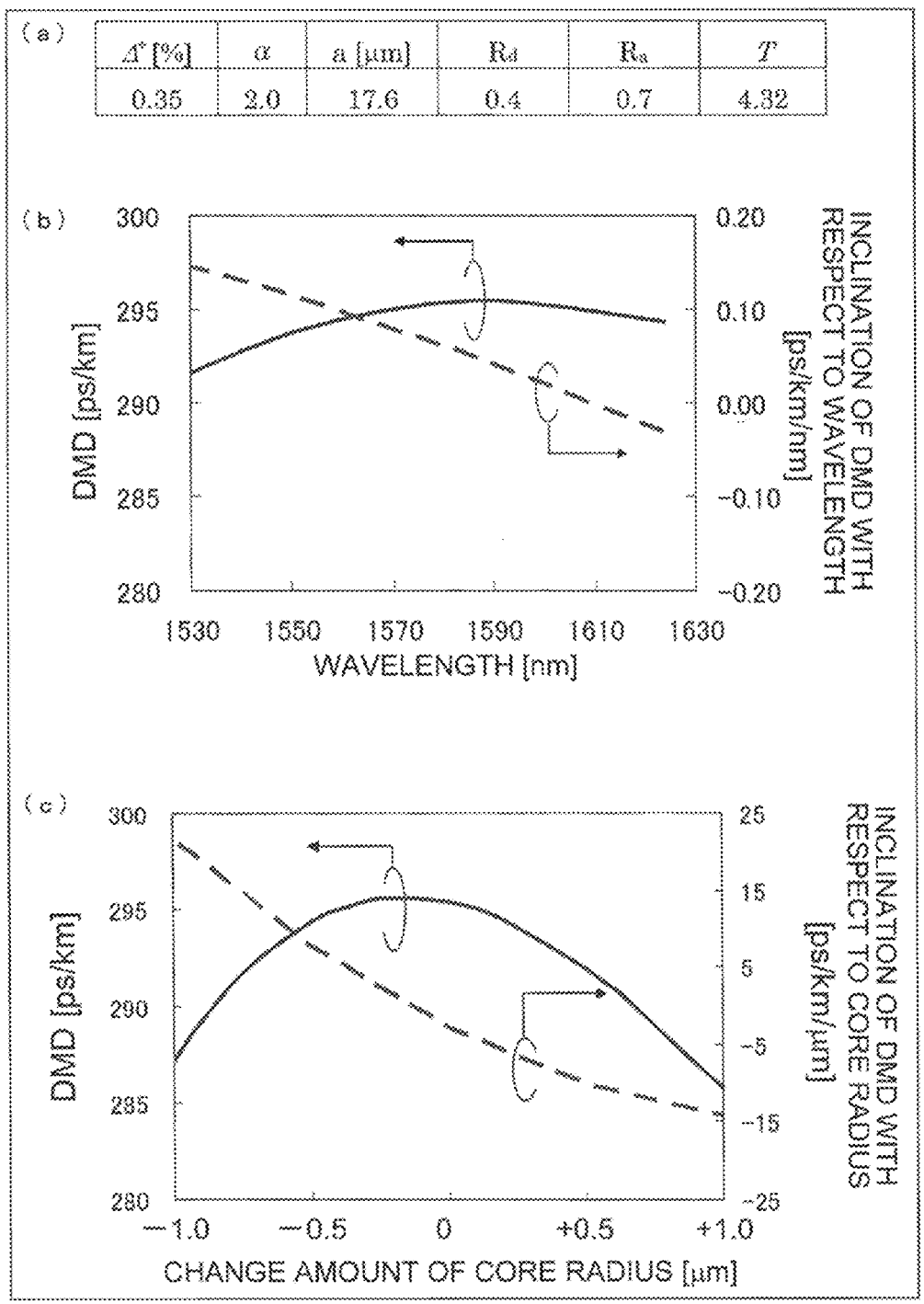

(a) of FIG. 9 shows set values of parameters defining a refractive index distribution in an optical fiber of Example 1. (b) is a graph showing a mode dispersion characteristic of the optical fiber in accordance with Example 1. (c) is a graph showing a relationship between a change amount of a core radius and the mode dispersion characteristic of the optical fiber in accordance with Example 1.

Figure 10:
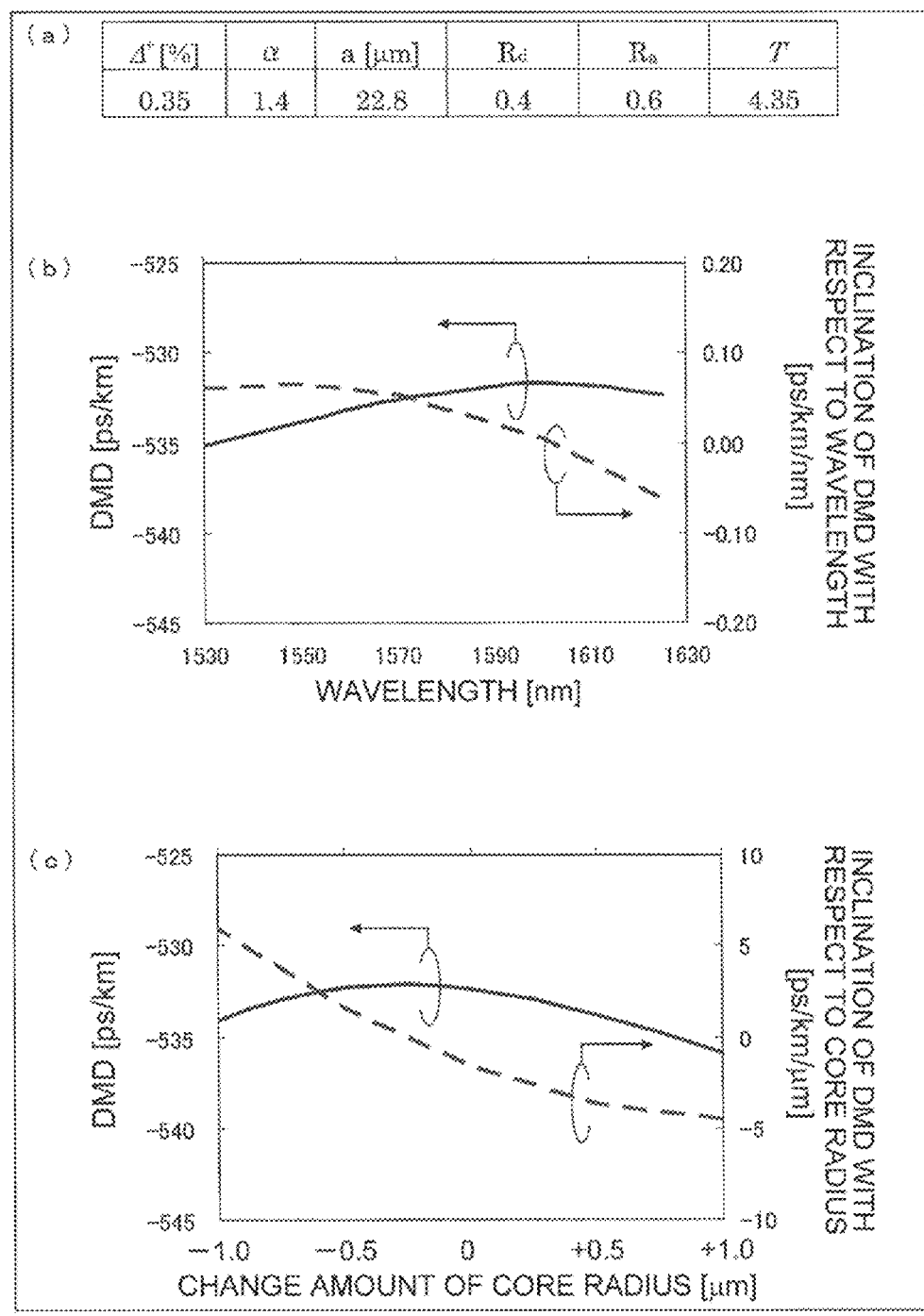

(a) of FIG. 10 shows set values of parameters defining a refractive index distribution in an optical fiber of Example 2. (b) is a graph showing a mode dispersion characteristic of the optical fiber in accordance with Example 2. (c) is a graph showing a relationship between a change amount of a core radius and the mode dispersion characteristic of the optical fiber in accordance with Example 2.

Figure 11:
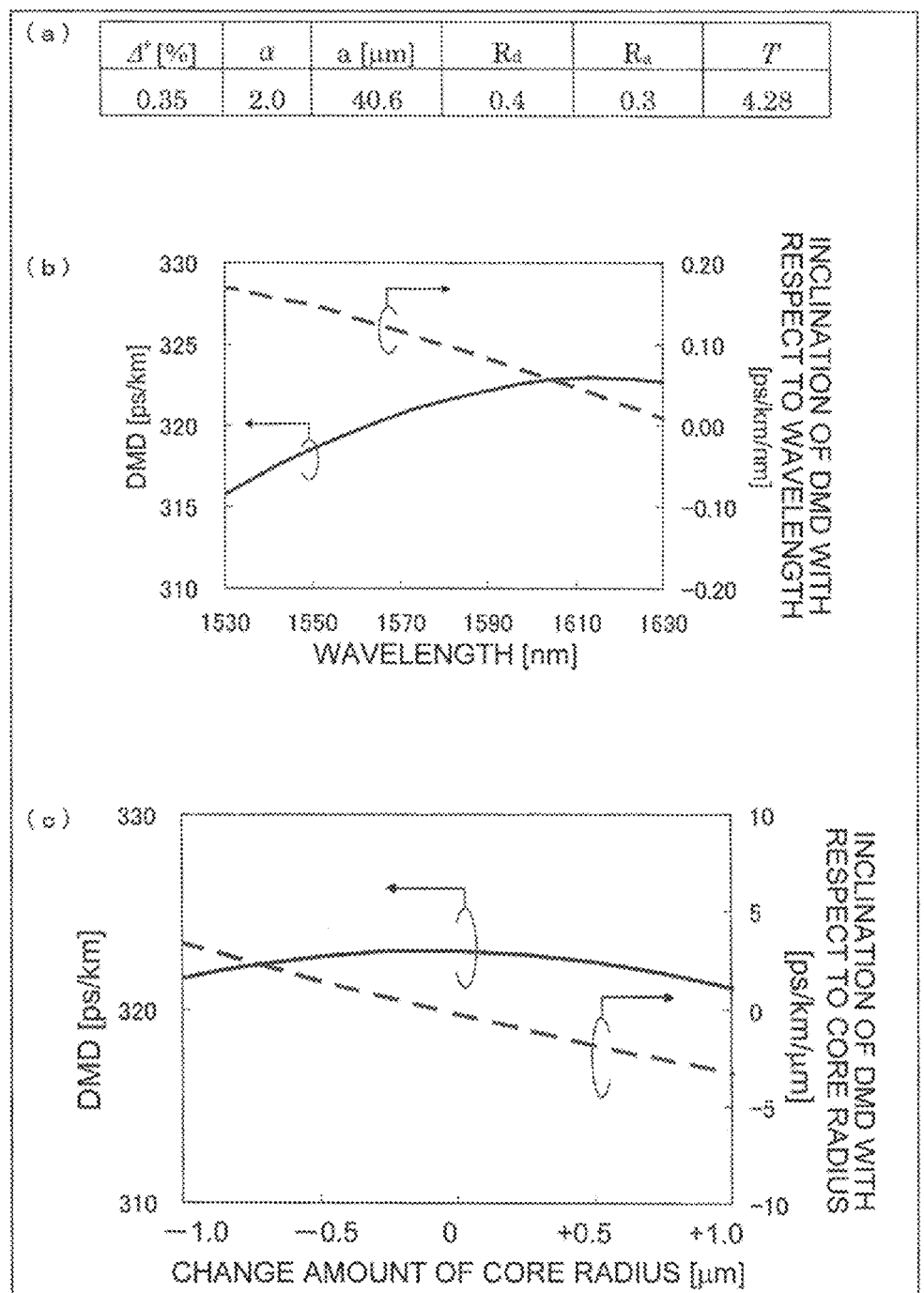

(a) of FIG. 11 shows set values of parameters defining a refractive index distribution in an optical fiber of Example 3. (b) is a graph showing a mode dispersion characteristic of the optical fiber in accordance with Example 3. (c) is a graph showing a relationship between a change amount of a core radius and the mode dispersion characteristic of the optical fiber in accordance with Example 3.

Figure 12:
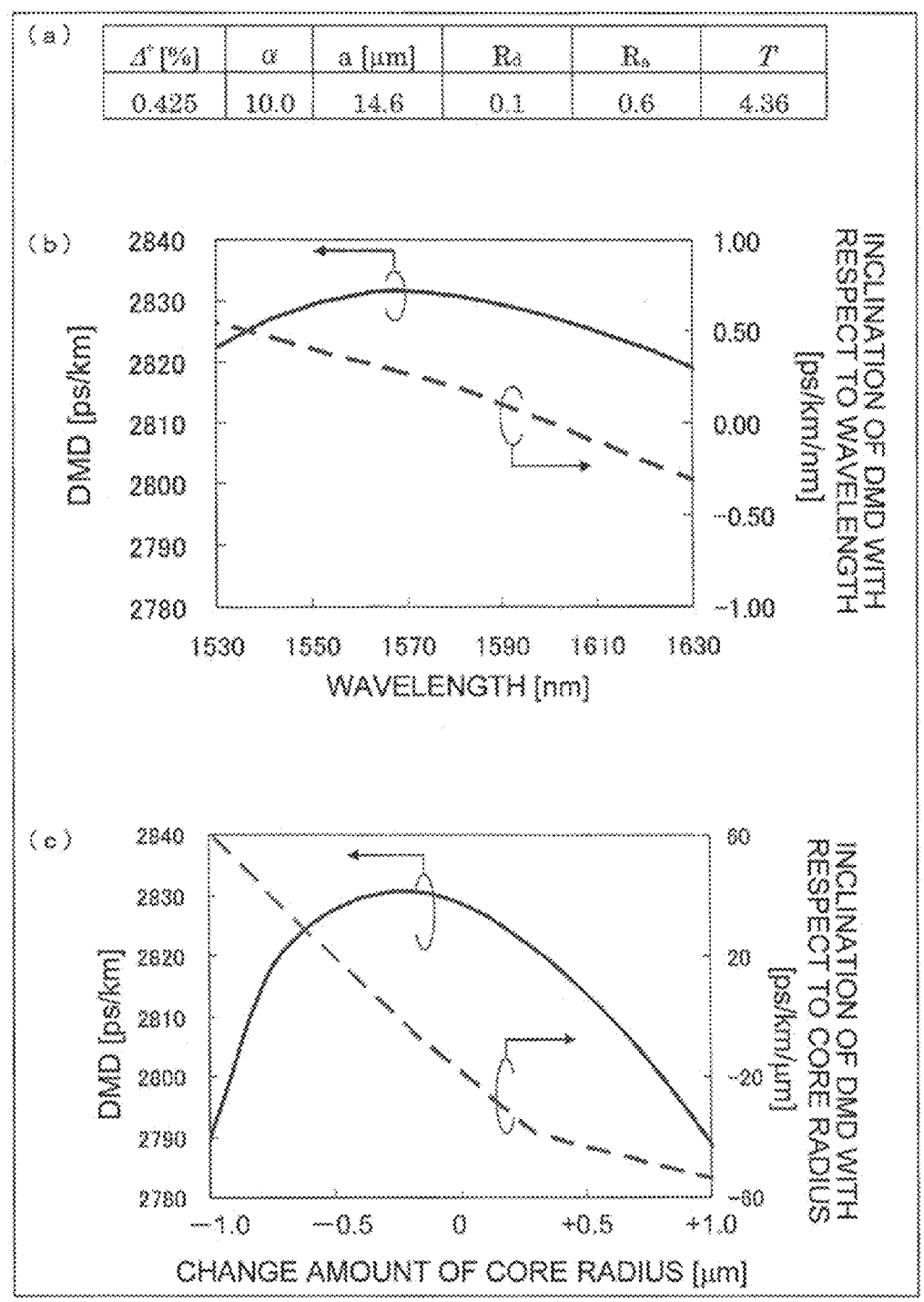

(a) of FIG. 12 shows set values of parameters defining a refractive index distribution in an optical fiber of Example 4. (b) is a graph showing a mode dispersion characteristic of the optical fiber in accordance with Example 4. (c) is a graph showing a relationship between a change amount of a core radius and the mode dispersion characteristic of the optical fiber in accordance with Example 4.

Figure 13:
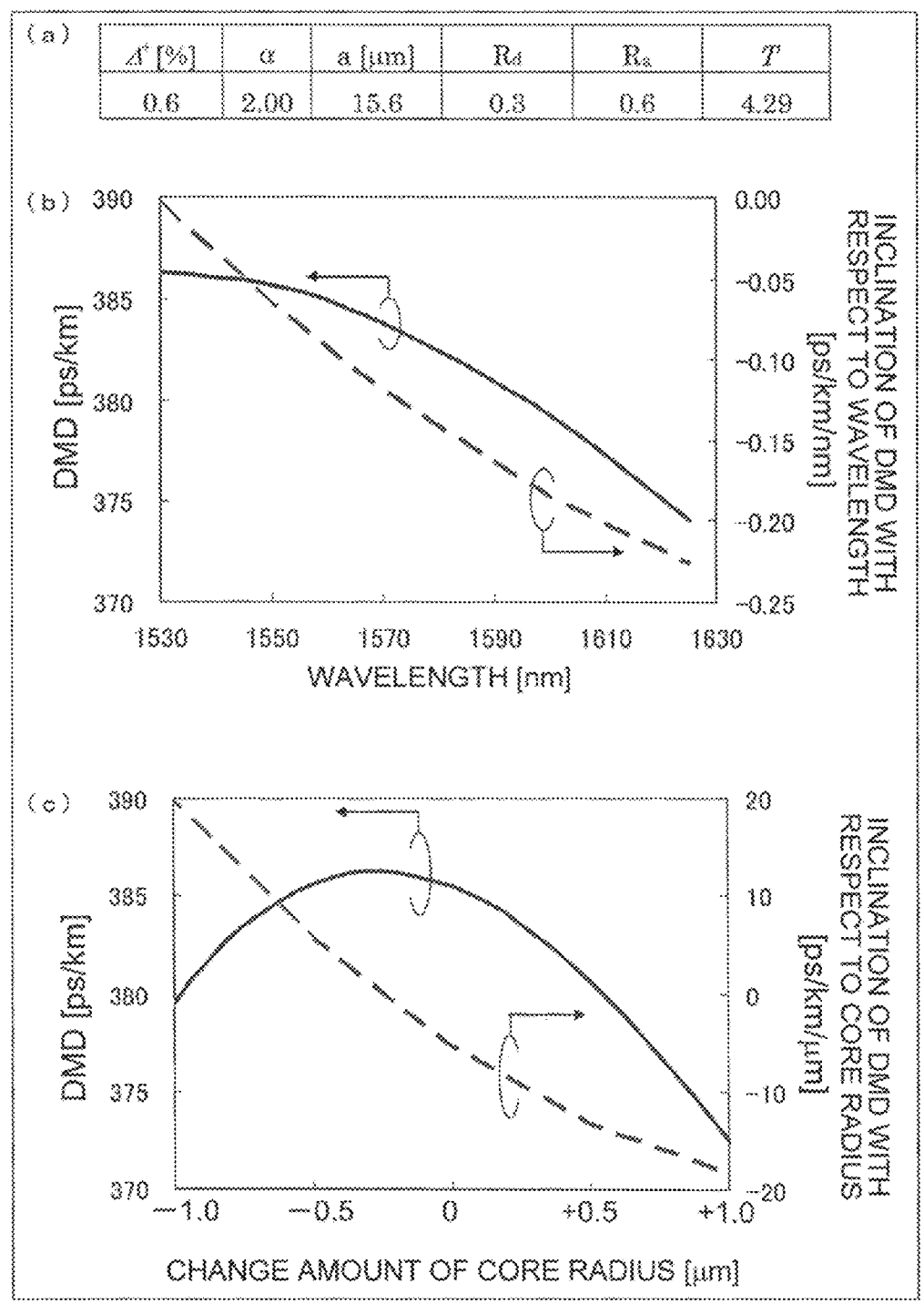

(a) of FIG. 13 shows set values of parameters defining a refractive index distribution in an optical fiber of Example 5. (b) is a graph showing a mode dispersion characteristic of the optical fiber in accordance with Example 5. (c) is a graph showing a relationship between a change amount of a core radius and the mode dispersion characteristic of the optical fiber in accordance with Example 5.

Figure 14:
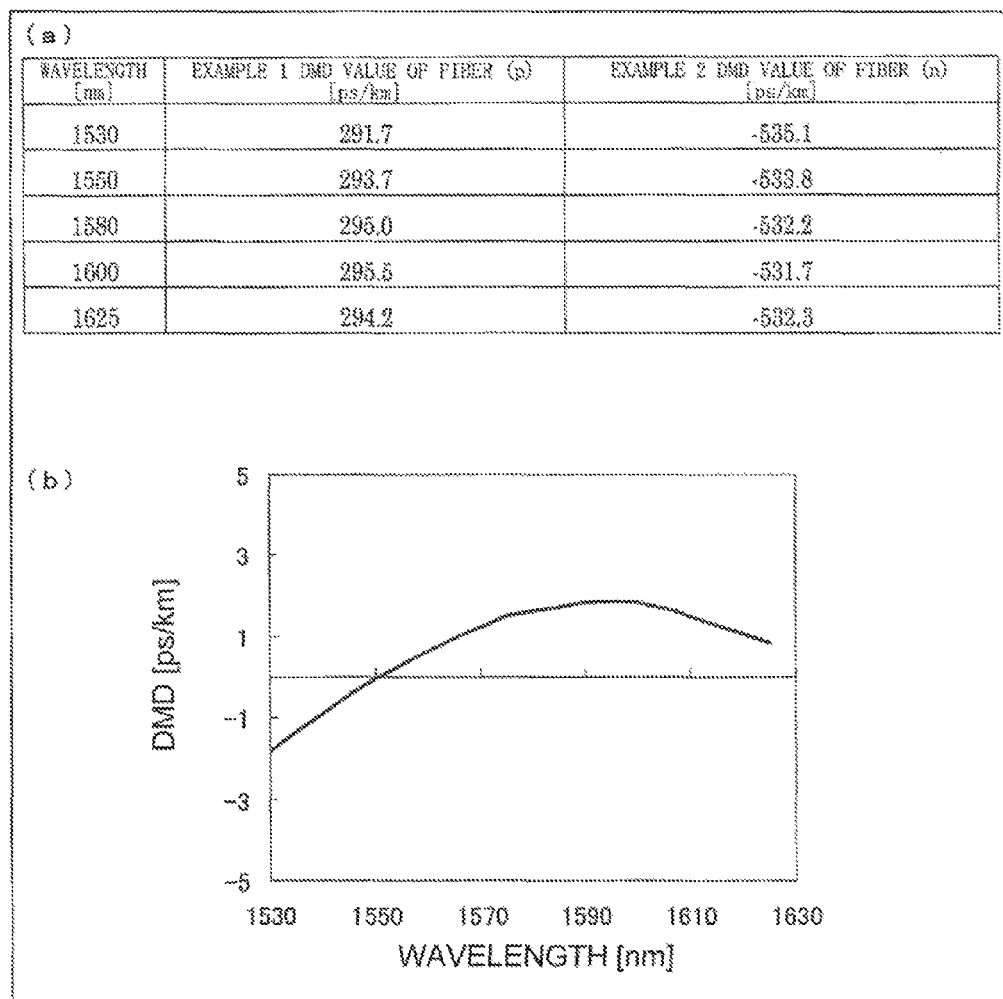

(a) of FIG. 14 shows a mode dispersion Δτ of each optical fiber in a light transmission path of Example 6. (b) is a graph showing a mode dispersion characteristic of the light transmission path of Example 6.

FIG. 15 shows set values of parameters defining a refractive index distribution of an optical fiber of this comparison example.

FIG. 16 is a graph showing a mode dispersion characteristic of an optical fiber in accordance with this comparison example.

FIG. 17 is a graph showing a relationship between a change amount of a core radius and a mode dispersion characteristic of an optical fiber in accordance with this comparison example.

FIG. 18 is a graph showing a mode dispersion characteristic of a conventional optical fiber.

DESCRIPTION OF EMBODIMENTS

The following description will discuss a light transmission path and an optical fiber in accordance with one embodiment of the present invention with reference to FIG. 1 through FIG. 8. Note that, in the specification and attached drawings, a mode dispersion Δτ is referred to also as "DMD (Differential Modal Group Delay)" in some cases.

[Configuration of Light Transmission Path]

Figure 1:
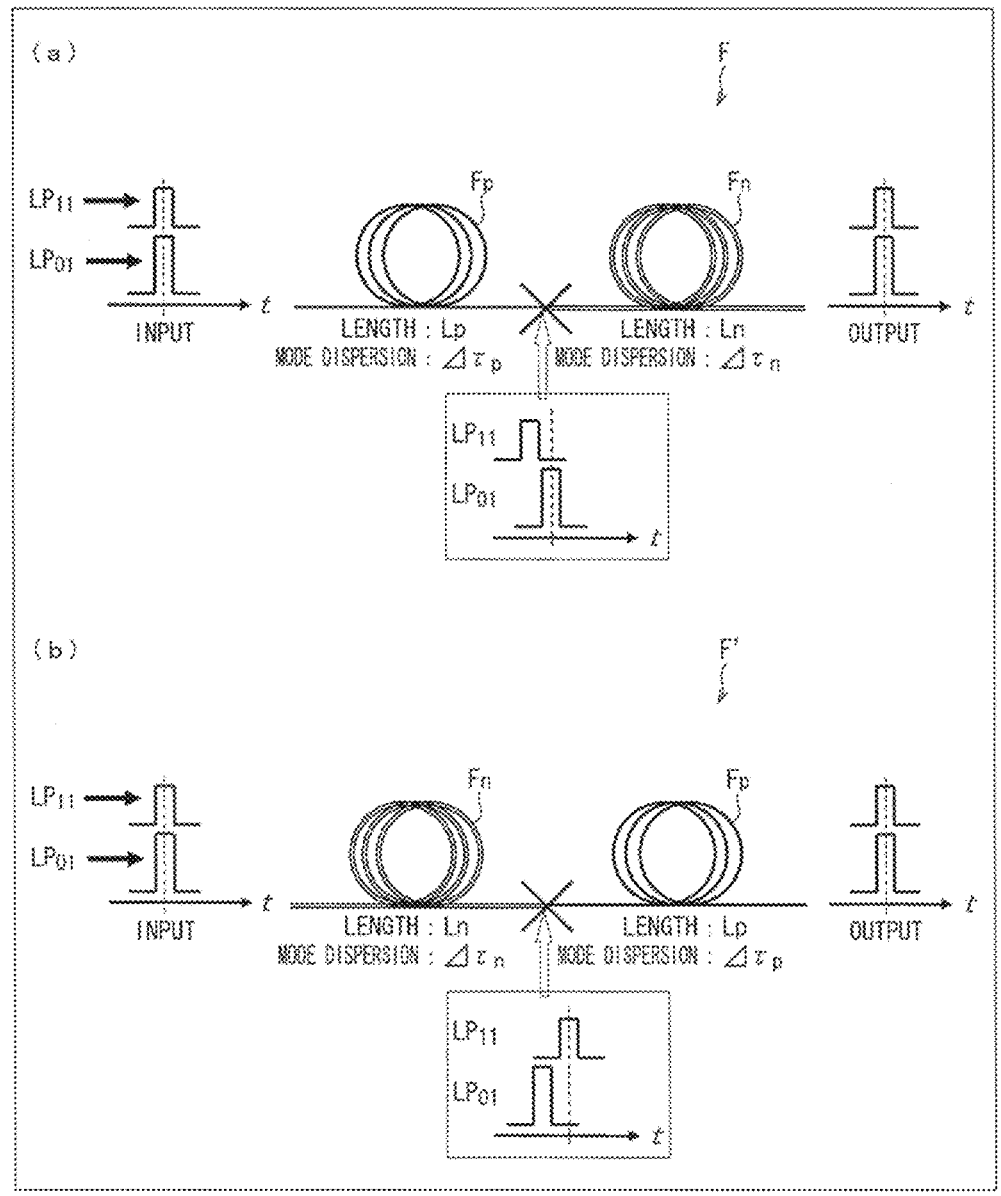
FIG. 1 is views each of which illustrates a configuration of a light transmission path in accordance with one embodiment of the present invention.

FIG. 1 shows configurations of light transmission paths F, F' in accordance with this embodiment. The light transmission paths F, F' both include at least two optical fibers Fp, Fn as illustrated in FIG. 1. The optical fiber Fp is a two-mode optical fiber having a positive mode dispersion Δτp, meanwhile, the optical fiber Fn is a two-mode optical fiber having a negative mode dispersion Δτn. The both mode dispersions Δτp, Δτn are defined by the above mathematical formula (2).

(a) of FIG. 1 illustrates a configuration example of a light transmission path F in which the optical fiber Fp having the positive mode dispersion Δτp is located on an input side and the optical fiber Fn having the negative mode dispersion Δτn is located on an output side. In the light transmission path F, a time period for propagating an LP11 mode component through the optical fiber Fp is longer by Δτp×Lp (Lp=length of the optical fiber Fp) than a time period for propagating an LP01 mode component through the optical fiber Fp. Therefore, a time period of Δτp×Lp is lagged behind during a process for propagating the LP11 mode component through the optical fiber Fp.

Meanwhile, in the light transmission path F, the time period for propagating the LP mode component through the optical fiber Fn is shorter by Δτn×Ln (Ln=length of the optical fiber Fn) than the time period for propagating the LP01 mode component through the optical fiber Fn. Therefore, a time period of Δτn×Ln is retrieved during a process for propagating the LP11 mode component through the optical fiber Fn.

Therefore, in the light transmission path F, by setting the length Lp of the optical fiber Fp and the length Ln of the optical fiber Fn so that Δτp×Lp+Δτn×Ln is satisfactorily small and, more preferably, Δτp×Lp+Δτn×Ln is 0 (zero), the light transmission path F can satisfactorily compensate a mode dispersion in the light transmission path F, i.e., hardly cause the mode dispersion.

In particular, because, in the light transmission path F of this embodiment, an optical fiber whose mode dispersion characteristic does not depend on a wavelength λ (see FIG. 2) is used as each of the optical fibers Fp, Fn, the lengths of the respective optical fibers Fp, Fn can be set to compensate the mode dispersion without considering the wavelength λ. Consequently, it is possible to satisfactorily compensate the mode dispersion in a whole desired wavelength band.

(b) of FIG. 1 illustrates a configuration example of the light transmission path F' in which the optical fiber Fn having the negative mode dispersion Δτn is located on the input side and the optical fiber Fp having the positive mode dispersion Δτp is located on the output side. In the light transmission path F', a time period for propagating the LP01 mode component through the optical fiber Fn is longer by Δτp×Lp than a time period for propagating the LP11 mode component through the optical fiber Fn. Therefore, the time period of Δτn×Ln is lagged behind during the process of propagating the LP01 mode component through the optical fiber Fn.

Meanwhile, in the light transmission path F', the time period for propagating the LP01 mode component through the optical fiber Fp is shorter by Δτp×Lp than the time period for propagating the LP11 mode component through the optical fiber Fp. Therefore, the time period of Δτp×Lp is retrieved during the process for propagating the LP01 mode component through the optical fiber Fp.

Therefore, in the light transmission path F', by setting the length Lp of the optical fiber Fp and the length Ln of the optical fiber Fn so that Δτp×Lp+Δτn×Ln is satisfactorily small and, more preferably, Δτp×Lp+Δτn×Ln is 0 (zero), the light transmission path F' can satisfactorily compensate a mode dispersion in the light transmission path F', i.e., hardly cause the mode dispersion.

In particular, because, in the light transmission path F' of this embodiment, an optical fiber whose mode dispersion characteristic does not depend on a wavelength λ (see FIG. 2) is used as each of the optical fibers Fp, Fn, the lengths of the respective optical fibers Fp, Fn can be set to compensate the mode dispersion without considering the wavelength λ. Consequently, it is possible to satisfactorily compensate the mode dispersion in a whole desired wavelength band.

[Mode Dispersion Characteristic of Optical Fiber]

Figure 2:
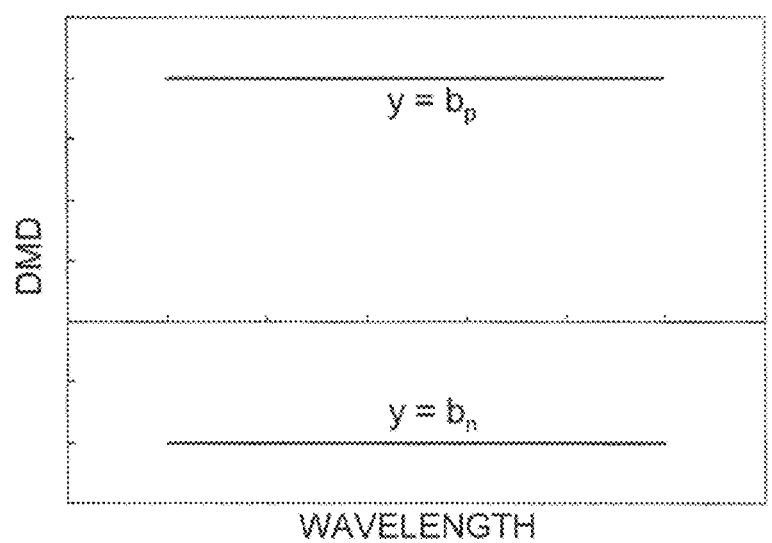
FIG. 2 is a graph showing a mode dispersion characteristic of an optical fiber in accordance with this embodiment.

FIG. 2 is a graph showing a mode dispersion characteristic of the optical fibers Fp, Fn in accordance with this embodiment. In particular, FIG. 2 shows characteristics of mode dispersions of the optical fibers Fp, Fn in a band of 1530 nm to 1625 nm which is a wavelength band for a predetermined communication. In FIG. 2, the x axis denotes a wavelength and the y axis denotes a mode dispersion.

The point to be focused in FIG. 2 is that the optical fiber Fp has a positive mode dispersion characteristic represented by y=bp and the optical fiber Fn has a negative mode dispersion characteristic represented by y=bn. That is, a gradient dΔτp/dλ of the mode dispersion Δτp of the optical fiber Fp with respect to the wavelength λ is zero, and a gradient dΔτn/dλ of the mode dispersion Δτn of the optical fiber Fn with respect to wavelength λ is also zero. In other words, at least in the band of 1530 nm to 1625 nm, both the mode dispersion Δτp of the optical fiber Fp and the mode dispersion Δτn of the optical fiber Fn do not depend on the wavelength λ and are constant.

Therefore, in the light transmission paths F, F' (see FIG. 1) with use of the optical fibers Fp, Fn, the lengths Lp, Ln of the respective optical fibers Fp, Fn are set to compensate the mode dispersion without considering the wavelength λ. Consequently, it is possible to satisfactorily compensate the mode dispersion in the whole band of 1530 nm to 1625 nm.

Note that "mode dispersion(s) is/are constant" in this specification is not limited to gradient of the mode dispersion with respect to the wavelength λ=0 and may be a gradient of the mode dispersion with respect to the wavelength λ≈0. That is, in a case where the gradient of the mode dispersion with respect to the wavelength λ is satisfactorily so small that the mode dispersion can be satisfactorily compensated in the whole band of 1530 nm to 1625 nm, a mode dispersion characteristic thereof is encompassed in a range of "mode dispersion(s) is/are constant". For example, in a case where the gradient dΔτ/dλ of the mode dispersion Δτ with respect to the wavelength λ is |0.5| ps/km/nm or less, it is determined that "mode dispersion(s) is/are constant".

Note that, by changing the refractive index distribution as appropriate, it is possible to use, as an optical fiber in accordance with this embodiment, the optical fiber Fp having the positive mode dispersion Δτp or the optical fiber Fn having the negative mode dispersion Δτn.

[Configuration of Optical Fiber]

Figure 3:
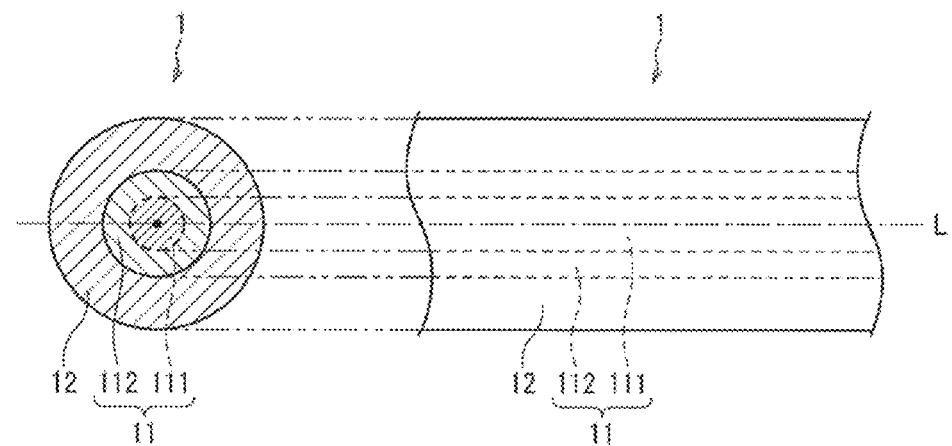
FIG. 3 is a cross-sectional view and a side view illustrating a configuration of an optical fiber in accordance with this embodiment.

FIG. 3 is a cross-sectional view and a side view illustrating a configuration of an optical fiber 1 in accordance with this embodiment. The optical fibers Fp, Fn of this embodiment (FIGS. 1, 2) have a similar configuration to that of the optical fiber 1.

The optical fiber 1 is a cylindrical structure mainly made from silica glass. The optical fiber 1 includes a core 11 and a clad 12. The core 11 has a circular cross section. The clad 12 has a ring-like cross section surrounding the core 11.

The core 11 includes an inner core 111 and an outer core 112. The inner core 111 has a circular cross section. The outer core 112 has a ring-like cross section surrounding the inner core 111. A circle of the cross section of the inner core 111 has a radius r1. A ring of the cross section of the outer core 112 has an internal circumference section having the radius r1 and has an outer circumference section having a radius r1+r2 (radius a). In the optical fiber 1, a cross-section structure illustrated in FIG. 3 is the same in each cross section orthogonal to a center axis L.

(Refractive Index Distribution of Optical Fiber)

Figure 4:
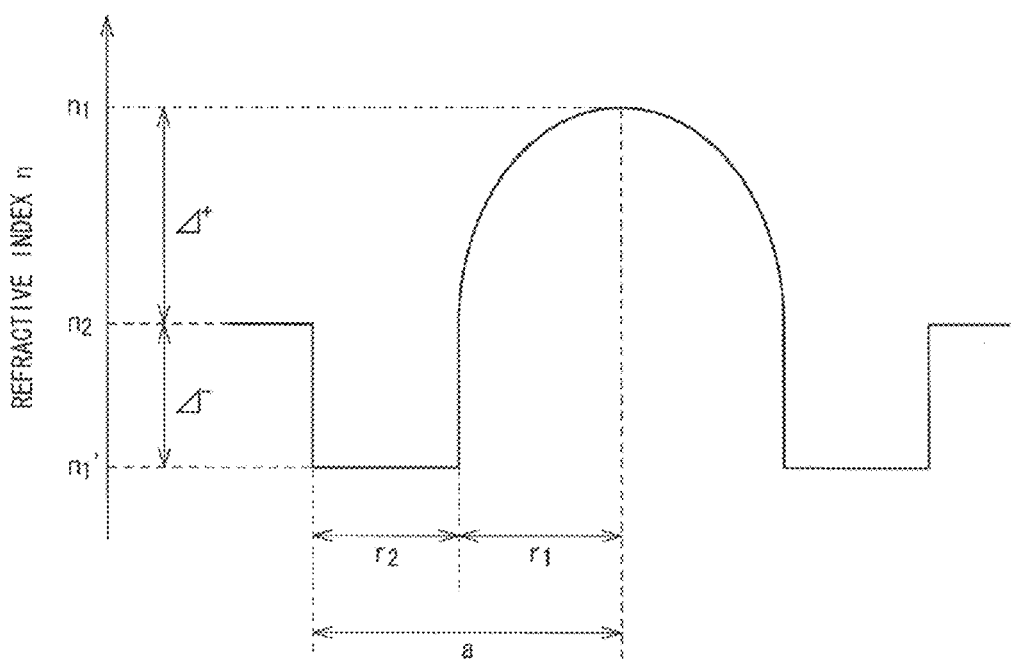
FIG. 4 is a graph showing a refractive index distribution of an optical fiber in accordance with this embodiment.

FIG. 4 is a graph showing a refractive index distribution of the optical fiber 1 in accordance with this embodiment. Note that the refractive index distribution illustrated in FIG. 4 can be achieved by a publicly-known method in which, for example, Ge (germanium) is added to partially increase a refractive index or F (fluorine) is added to partially decrease the refractive index.

The refractive index distribution of the inner core 111 is an $\alpha_{th}$-power-type refractive index distribution as shown in FIG. 4, and has a maximum value n1 on the center axis L. The αth-power-type refractive index distribution is a refractive index distribution in which a refractive index n(r) positioned in a point which is distant by r from the center axis L is $n1[1-2\delta(r/a)^{\alpha}]^{1/2}$, where δ is a relative refractive index difference between a center portion of the inner core 111 and the outer core 112. Note that, as α is increased, the αth-power-type refractive index distribution becomes more asymptotic to a stepwise refractive index distribution.

A refractive index n1' of the outer core 112 and a refractive index n2 of the clad 12 are constant as shown in FIG. 4. A maximum refractive index n1 of the inner core 111, the refractive index n1' of the outer core 112, and the refractive index n2 of the clad 12 have the following relationship: n1'<n2<n1. In the refractive index distribution of the optical fiber 1 shown in FIG. 4, a depression called "trench" is generated because there is a difference (n1'<n2) between the refractive index n2 of the outer core 112 and the refractive index n1' of the outer core 112.

Note that, in FIG. 4, Δ+ denotes a relative refractive index difference $[(n1^2-n2^2)/2n1^2]\times100$ [%] between a center of the inner core 111 and the clad 12, and Δ− denotes a relative refractive index difference $[(n1'^2-n2^2)/2n1'^2]\times100$ [%] between the outer core 112 and the clad 12. The relative refractive index difference Δ+ is referred to also as "core Δ".

In the following description, not only α and Δ+ described above but also Ra and Rd are used as a parameter for defining the refractive index distribution of the optical fiber 1. Ra denotes a ratio r1/a of the radius r1 of the inner core 111 to the radius a of the outer circumference section of the outer core 112. Meanwhile, Rd denotes a ratio |Δ−|/|Δ+| of an absolute value of the relative refractive index difference Δ− to an absolute value of the relative refractive index difference Δ+. That is, a depth of the trench (n2−n1') is shallower as Rd is smaller, and, when Rd is 0, the depth of the trench is 0.

In the following description, an equivalent V value T is used as an indicator showing a propagation characteristic of the optical fiber 1. The equivalent V value T is defined by $T=\int[n^2(r)-n^2(\infty)k]^{1/2}dr$ (integral range is 0 to ∞), and the equivalent V value T and a normalized frequency V have a relationship of a mathematical formula (3) below. In the definitional equation of the equivalent V value T, n(r) represents a refractive index positioned in a point which is distant by r from the center axis L and k represents a wave number of light incident on the optical fiber 1 (hereinafter, referred to as "incident light"). A in the following mathematical formula (3) is a constant determined by the refractive index distribution.

[Math. 3]

$$T = \frac{V}{A} = \frac{\frac{2\pi}{\lambda}an_1\sqrt{2\left(\frac{n_1^2-n_2^2}{2n_1}\right)}}{A} \quad (3)$$

In the optical fiber 1 having the refractive index distribution shown in FIG. 4, in a case where the equivalent V value T is less than 2.5, a second-order mode (LP11) is interrupted, whereas, in a case where the equivalent V value T is 4.5 or less, a third-order mode (LP21) is interrupted. That is, in a case where the equivalent V value T is 2.5 or more but 4.5 or less, the optical fiber 1 functions as a two-mode optical fiber. Hereinafter, a range of 2.5≤T≤4.5 on the T axis is referred to as "two-mode area".

(Relationship Between Refractive Index Distribution and Mode Dispersion Characteristic)

The following description will discuss a relationship between the refractive index distribution and the mode dispersion characteristic of the optical fiber 1 with reference to FIG. 5 through FIG. 8. Note that, in the following description, the mode dispersion Δτ is used as a function of the equivalent V value T, instead of being used as a function of the wavelength λ. As is clear from the above mathematical formula (3), change in equivalent V value T is equivalent to change in core radius and change in wavelength λ. Therefore, in a case where the gradient (dΔτ/dT) of the mode dispersion Δτ with respect to the equivalent V value T≈0, the gradient of the mode dispersion Δτ with respect to the core radius and the gradient of the mode dispersion Δτ with respect to the wavelength λ are both ≈0.

Figure 5:
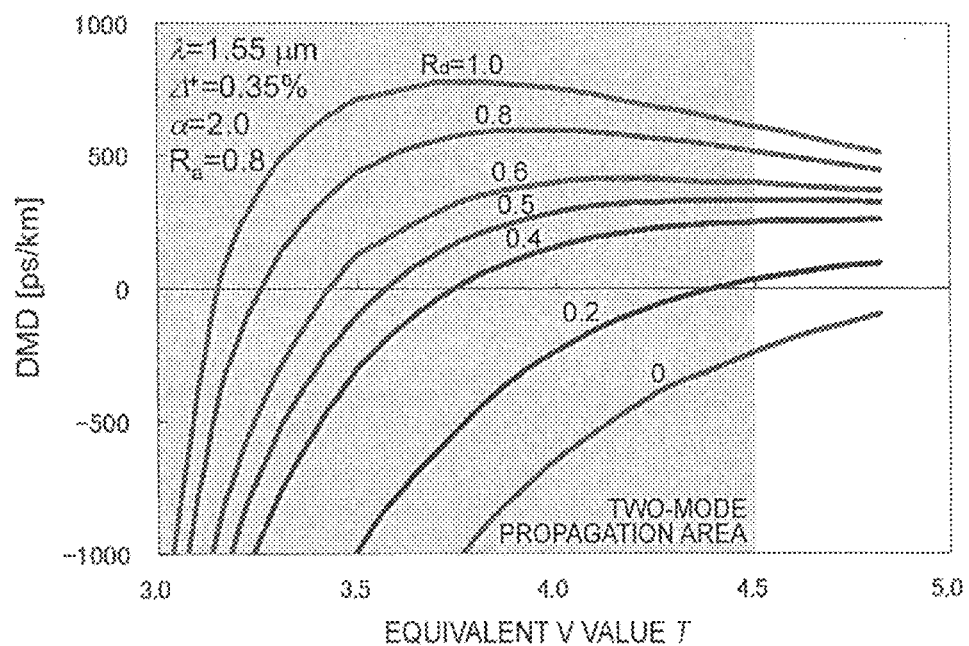
FIG. 5 is a graph showing a relationship between a parameter Rd and a mode dispersion characteristic of an optical fiber in accordance with this embodiment.

First, the following description will discuss an influence of the parameter Rd on the mode dispersion characteristic with reference to FIG. 5. FIG. 5 is a graph showing a relationship between the parameter Rd and the mode dispersion characteristic of the optical fiber 1 in accordance with this embodiment. In particular, FIG. 5 is a graph of Δτ(T) obtained when Rd is 0, 0.2, 0.4, 0.5, 0.6, 0.8, and 1.0. Herein, α is set to 2.0, Δ+ is set to 0.35%, and Ra is set to 0.8. The wavelength λ of the incident light is set to 1.55 μm.

As is clear from the graph shown in FIG. 5, the gradient (dΔτ/dT) of the mode dispersion Δτ with respect to the equivalent V value T is changed by changing the parameter Rd. In particular, in a case where Rd is gradually increased, dΔτ/dT≈0 when Rd is about 0.4. Therefore, by setting Rd to about 0.4, it is possible to control dΔτ/dT≈0.

Figure 6:
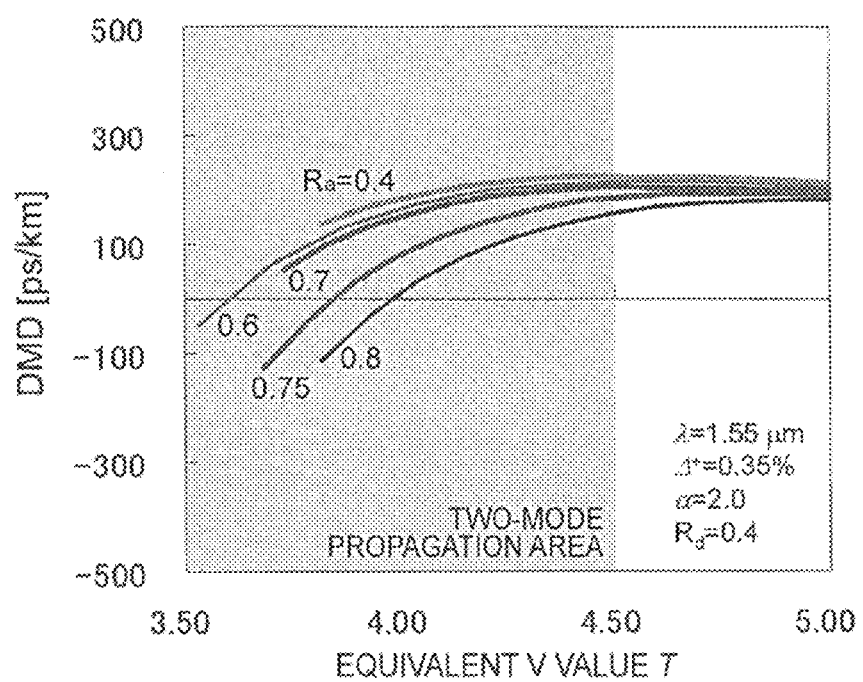
FIG. 6 is a graph showing a relationship between a parameter Ra and a mode dispersion characteristic of an optical fiber in accordance with this embodiment.

The following description will discuss an influence of the parameter Ra on the mode dispersion characteristic with reference to FIG. 6. FIG. 6 is a graph showing a relationship between the parameter Ra and the mode dispersion characteristic of the optical fiber 1 in accordance with this embodiment. In particular, FIG. 6 is a graph of Δτ(T) obtained in a case where Ra is 0.4, 0.6, 0.7, 0.75, and 0.8. Herein, α is set to 2.0, Δ+ is set to 0.35%, and Rd is set to 0.4. The wavelength λ of the incident light is set to 1.55 μm.

As is clear from the graph shown in FIG. 6, the mode dispersion characteristic is shifted (i.e., equivalent V value T is changed) in a transverse-axis direction by changing Ra. In particular, dΔτ/dT is closer to 0 as the equivalent V value T is larger. In addition, a condition of Ra to obtain a solution of dΔτ/dT≈0 in the two-mode area is Ra≤0.7. Therefore, by setting Ra≤0.7, it is possible to control dΔτ/dT≈0.

Figure 7:
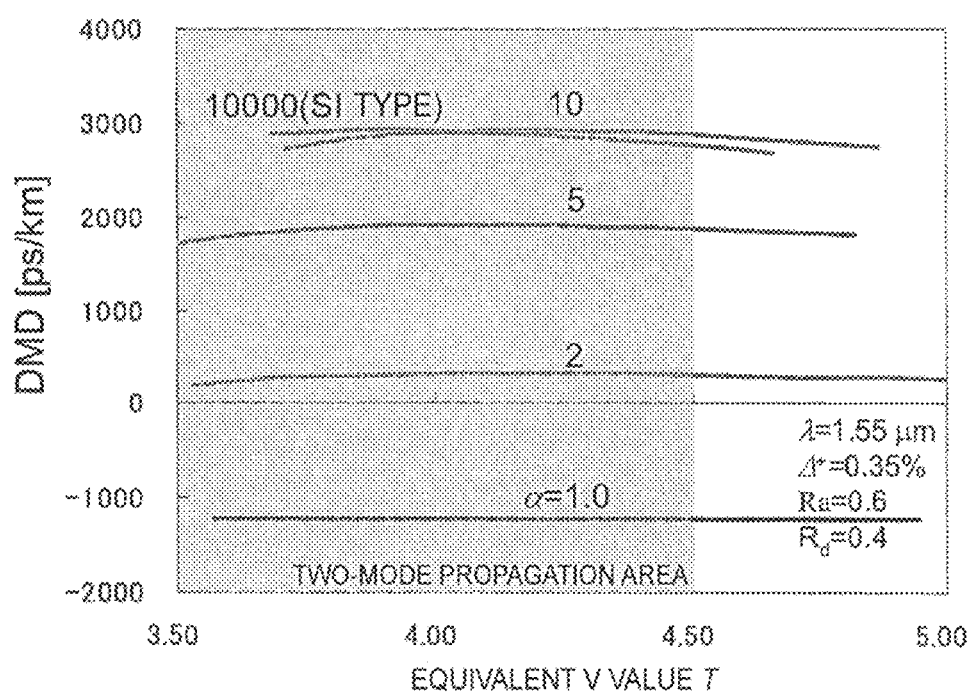
FIG. 7 is a graph showing a relationship between a parameter α and a mode dispersion characteristic of an optical fiber in accordance with this embodiment.

The following description will discuss an influence of the parameter α on the mode dispersion characteristic with reference to FIG. 7. FIG. 7 is a graph showing a relationship between the parameter α and the mode dispersion characteristic of the optical fiber 1 in accordance with this embodiment. In particular, FIG. 7 is a graph of Δτ(T) obtained in a case where a is 1, 2, 5, 10, and 10,000. Herein, Δ+ is set to 0.35%, Ra is set to 0.6, and Rd is set to 0.4. The wavelength λ of the incident light is set to 1.55 μm.

As is clear from the graph of FIG. 7, the mode dispersion characteristic is shifted (i.e., mode dispersion Δτ is changed) in a vertical-axis direction by changing α. Meanwhile, as is clear from the graph shown in FIG. 7, dΔτ/dT≈0, i.e., dΔτ/dT is hardly changed even if a is changed within a range of 1.0 to 10.0. Therefore, by setting α to an arbitrary value (more surely, 1.0≤α≤10.0), it is possible to control dΔτ/dT≈0.

Figure 8:
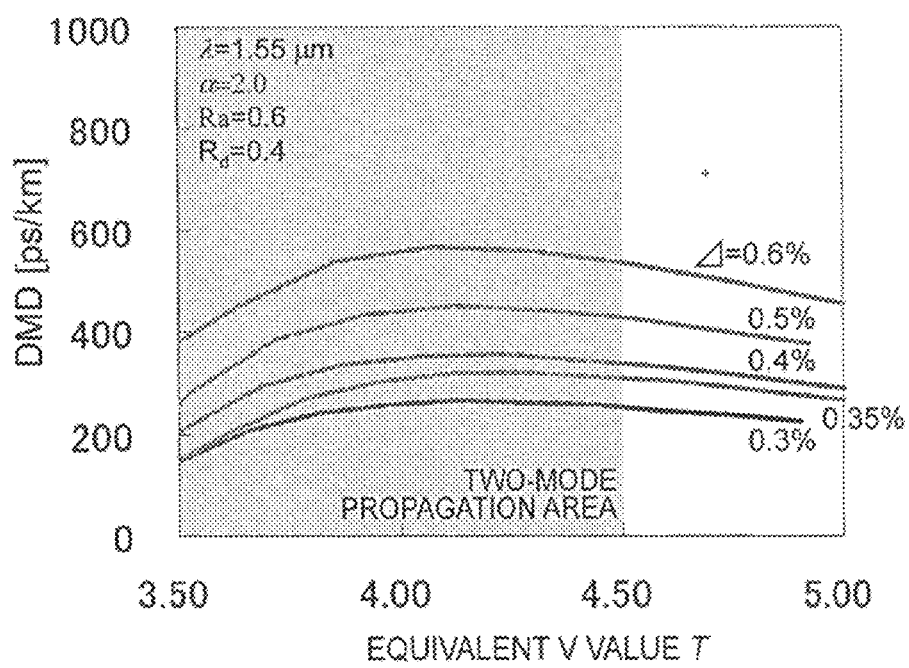
FIG. 8 is a graph showing a relationship between a parameter Δ+ and a mode dispersion characteristic of an optical fiber in accordance with this embodiment.

The following description will discuss an influence of the parameter Δ+ on the mode dispersion characteristic with reference to FIG. 8. FIG. 8 is a graph showing a relationship between the parameter Δ+ and the mode dispersion characteristic of the optical fiber 1 in accordance with this embodiment. In particular, FIG. 8 is a graph of Δτ(T) obtained in a case where Δ+ is set to 0.3%, 0.35%, 0.4%, 0.5%, and 0.6%. Herein, α is set to 2.0, and Ra is set to 0.6, Rd and is set to 0.4. The wavelength λ of the incident light is set to 1.55 μm.

As is clear from the graph shown in FIG. 8, the mode dispersion characteristic is shifted (i.e., mode dispersion Δτ is changed) in a vertical-axis direction by changing Δ+. Meanwhile, as is clear from the graph shown in FIG. 8, dΔτ/dT is hardly changed even if Δ+ is changed within a range of 0.3 to 0.6. Therefore, by setting Δ+ to an arbitrary value (more surely, 0.3≤Δ+≤0.6), it is possible to control dΔτ/dT≈0.

As described above, it is possible to achieve the two-mode optical fiber which satisfies the condition of dΔτ/dT≈0 under the condition of Ra≤0.7 by setting Rd to about 0.4, setting α to an arbitrary value (more surely, 1.0≤α≤10.0), and setting Δ+ to an arbitrary value (more surely, 0.3≤Δ+≤0.6). By using such an optical fiber as the optical fibers Fp, Fn, it is possible to achieve the light transmission paths F, F' which can satisfactorily compensate mode dispersion in a whole desired wavelength band.

EXAMPLES

Example 1

The following description will discuss Example 1 of the optical fiber 1 in accordance with this embodiment with reference to (a) of FIG. 9 through (c) of FIG. 9. (a) of FIG. 9 shows set values of parameters defining a refractive index distribution of the optical fiber 1 of Example 1. (b) of FIG. 9 shows a graph showing a mode dispersion characteristic of the optical fiber 1 in accordance with Example 1.

As shown in (a) of FIG. 9, Ra=0.7, Rd=0.4, α=2.0, and Δ+=0.35 were set in Example 1. As a result, as shown in (b) of FIG. 9, in a band of 1530 nm to 1625 nm, the optical fiber 1 of Example 1 had the mode dispersion Δτ of 290 ps/km to 296 ps/km, and a gradient dΔτ/dλ of the mode dispersion Δτ with respect to a wavelength λ was |0.15| ps/km/nm or less, i.e., the gradient was extremely small. Therefore, it was confirmed that the optical fiber 1 of Example 1 satisfactorily compensated the mode dispersion in the whole band of 1530 nm to 1625 nm.

The following description will discuss an influence of change in core radius on the mode dispersion characteristic of the optical fiber 1 of Example 1 with reference to (c) of FIG. 9. (c) of FIG. 9 is a graph showing a relationship between a change amount of the core radius and the mode dispersion characteristic of the optical fiber 1 in accordance with Example 1. As shown in (c) of FIG. 9, it was confirmed that, in the optical fiber 1 of Example 1, the gradient of the mode dispersion Δτ with respect to the core radius was |25| ps/km/μm or less, i.e., the influence of change in core diameter on the mode dispersion was extremely small.

As described above, according to Example 1, it was confirmed that, in the optical fiber 1 of this embodiment, the influence of the wavelength λ and the core diameter on the mode dispersion was small by setting the parameters as appropriate as shown (a) of FIG. 9. Therefore, by using, as the optical fiber Fp, the optical fiber having the parameters that have been set as described above, it is possible to achieve the light transmission paths F, F' which satisfactorily compensate the mode dispersion in a whole desired wavelength band as described above.

Example 2

The following description will discuss Example 2 of the optical fiber 1 in accordance with this embodiment with reference to (a) of FIG. 10 to (c) of FIG. 10. (a) of FIG. 10 shows set values of parameters defining a refractive index distribution of the optical fiber 1 of Example 2. (b) of FIG. 10 is a graph showing the mode dispersion characteristic of the optical fiber 1 in accordance with Example 2.

As shown in (a) of FIG. 10, in Example 2, Ra=0.6, Rd=0.4, α=1.4, and Δ+=0.35 were set. As a result, as shown in (b) of FIG. 10, in the band of 1530 nm to 1625 nm, the optical fiber 1 of Example 2 had the mode dispersion Δτ of −540 ps/km to −530 ps/km, and the gradient dΔτ/dλ of the mode dispersion Δτ with respect to the wavelength λ was |0.10| ps/km/nm or less, i.e., the gradient was extremely small. Therefore, it was confirmed that the optical fiber 1 of Example 2 satisfactorily compensated the mode dispersion in the whole band of 1530 nm to 1625 nm.

The following description will discuss an influence of change in core radius on the mode dispersion characteristic of the optical fiber 1 of Example 2 with reference to (c) of FIG. 10. (c) of FIG. 10 is a graph showing a relationship between a change amount of the core radius and the mode dispersion characteristic of the optical fiber 1 in accordance with Example 2. As shown in (c) of FIG. 10, it was confirmed that, in the optical fiber 1 of Example 2, the gradient of the mode dispersion Δτ with respect to the core radius was |6| ps/km/μm or less, i.e., the influence of change in core diameter on the mode dispersion was extremely small.

As described above, according to Example 2, it was confirmed that, in the optical fiber 1 of this embodiment, the influence of the wavelength λ and the core diameter on the mode dispersion was small by setting the parameters as appropriate as shown (a) of FIG. 10. Therefore, by using, as the optical fiber Fn, the optical fiber having the parameters that have been set as described above, it is possible to achieve the light transmission paths F, F' which satisfactorily compensate the mode dispersion in a whole desired wavelength band as described above.

Example 3

The following description will discuss Example 3 of the optical fiber 1 in accordance with this embodiment with reference to (a) of FIG. 11 to (c) of FIG. 11. (a) of FIG. 11 shows set values of parameters defining a refractive index distribution of the optical fiber 1 of Example 3. (b) of FIG. 11 is a graph showing the mode dispersion characteristic of the optical fiber 1 in accordance with Example 3.

As shown in (a) of FIG. 11, in Example 3, Ra=0.3, Rd=0.4, α=2.0, and Δ+=0.35 were set. As a result, as shown in (b) of FIG. 11, in the band of 1530 nm to 1625 nm, the optical fiber 1 of Example 3 had the mode dispersion Δτ of 315 ps/km to 325 ps/km, and the gradient dΔτ/dλ of the mode dispersion Δτ with respect to the wavelength λ was |0.20| ps/km/nm or less, i.e., the gradient was extremely small. Therefore, it was confirmed that the optical fiber 1 of Example 3 satisfactorily compensated the mode dispersion in the whole band of 1530 nm to 1625 nm.

The following description will discuss an influence of change in core radius on the mode dispersion characteristic of the optical fiber 1 of Example 3 with reference to (c) of FIG. 11. (c) of FIG. 11 is a graph showing a relationship between a change amount of the core radius and the mode dispersion characteristic of the optical fiber 1 in accordance with Example 3. As shown in (c) of FIG. 11, it was confirmed that, in the optical fiber 1 of Example 3, the gradient of the mode dispersion $\Delta\tau$ with respect to the core radius was |5| ps/km/µm or less, i.e., the influence of change in core diameter on the mode dispersion was extremely small.

As described above, according to Example 3, it was confirmed that, in the optical fiber 1 of this embodiment, the influence of the wavelength λ and the core diameter on the mode dispersion was small by setting the parameters as appropriate as shown (a) of FIG. 11. Therefore, by using, as the optical fiber Fp, the optical fiber having the parameters that have been set as described above, it is possible to achieve the light transmission paths F, F' which satisfactorily compensate the mode dispersion in a whole desired wavelength band.

Example 4

The following description will discuss Example 4 of the optical fiber 1 in accordance with this embodiment with reference to (a) of FIG. 12 to (c) of FIG. 12. (a) of FIG. 12 shows set values of parameters defining a refractive index distribution of an optical fiber 1 of Example 4. (b) of FIG. 12 is a graph showing the mode dispersion characteristic of the optical fiber 1 in accordance with Example 4.

As shown in (a) of FIG. 12, in Example 4, Ra=0.6, Rd=0.1, α=10.0, and Δ+=0.425 were set. As a result, as shown in (b) of FIG. 12, in the band of 1530 nm to 1625 nm, the optical fiber 1 of Example 4 had the mode dispersion $\Delta\tau$ of 2820 ps/km to 2835 ps/km, and the gradient d$\Delta\tau$/dλ of the mode dispersion $\Delta\tau$ with respect to the wavelength λ was |0.50| ps/km/nm or less, i.e., the gradient was extremely small. Therefore, it was confirmed that the optical fiber 1 of Example 4 satisfactorily compensated the mode dispersion in the whole band of 1530 nm to 1625 nm.

The following description will discuss an influence of change in core radius on the mode dispersion characteristic of the optical fiber 1 of Example 4 with reference to (c) of FIG. 12. (c) of FIG. 12 is a graph showing a relationship between a change amount of the core radius and the mode dispersion characteristic of the optical fiber 1 in accordance with Example 4. As shown in (c) of FIG. 12, it was confirmed that, in the optical fiber 1 of Example 4, the gradient of the mode dispersion $\Delta\tau$ with respect to the core radius was |60| ps/km/µm or less, i.e., the influence of change in core diameter on the mode dispersion was extremely small.

As described above, according to Example 4, it was confirmed that, in the optical fiber 1 of this embodiment, the influence of the wavelength λ and the core diameter on the mode dispersion was small by setting the parameters as appropriate as shown (a) of FIG. 12. Therefore, by using, as the optical fiber Fp, the optical fiber having the parameters that have been set as described above, it is possible to achieve the light transmission paths F, F' which satisfactorily compensate the mode dispersion in a whole desired wavelength band.

Example 5

The following description will discuss Example 5 of the optical fiber 1 in accordance with this embodiment with reference to (a) of FIG. 13 to (c) of FIG. 13. (a) of FIG. 13 shows set values of parameters defining a refractive index distribution of the optical fiber 1 of Example 5. (b) of FIG. 13 is a graph showing a mode dispersion characteristic of the optical fiber 1 in accordance with Example 5.

As shown in (a) of FIG. 13, in Example 5, Ra=0.6, Rd=0.3, α=2.0, and Δ+=0.6 were set. As a result, as shown in (b) of FIG. 13, in the band of 1530 nm to 1625 nm, the optical fiber 1 of Example 5 had the mode dispersion $\Delta\tau$ of 370 ps/km to 387 ps/km, and the gradient d$\Delta\tau$/dλ of the mode dispersion $\Delta\tau$ with respect to the wavelength λ was |0.20| ps/km/nm or less, i.e., the gradient was extremely small. Therefore, it was confirmed that the optical fiber 1 of Example 5 satisfactorily compensated the mode dispersion in the whole band of 1530 nm to 1625 nm.

The following description will discuss an influence of change in core radius on the mode dispersion characteristic of the optical fiber 1 of Example 5 with reference to (c) of FIG. 13. (c) of FIG. 13 is a graph showing a relationship between a change amount of the core radius and the mode dispersion characteristic of the optical fiber 1 in accordance with Example 5. As shown in (c) of FIG. 13, it was confirmed that, in the optical fiber 1 of Example 5, the gradient of the mode dispersion $\Delta\tau$ with respect to the core radius was |20| ps/km/µm or less, i.e., the influence of change in core diameter on the mode dispersion was extremely small.

As described above, according to Example 5, it was confirmed that, in the optical fiber 1 of this embodiment, the influence of the wavelength λ and the core diameter on the mode dispersion was small by setting the parameters as appropriate as shown (a) of FIG. 13. Therefore, by using, as the optical fiber Fp, the optical fiber having the parameters that have been set as described above, it is possible to achieve the light transmission paths F, F' which satisfactorily compensate the mode dispersion in a whole desired wavelength band.

Example 6

The following description will discuss an example (Example 6) of the light transmission path F in accordance with this embodiment with reference to (a) of FIG. 14 and (b) of FIG. 14. (a) of FIG. 14 shows mode dispersions $\Delta\tau$ of optical fibers Fp, Fn in the light transmission path F of Example 6. (b) of FIG. 14 is a graph showing a mode dispersion characteristic in the light transmission path F of Example 6.

In Example 6, the light transmission path F was configured by using the optical fiber 1 of Example 1 as the optical fiber Fp and the optical fiber 1 of Example 2 as the optical fiber Fn. That is, in Example 6, the light transmission path F was configured by using, in the band of 1530 nm to 1625 nm, the optical fibers Fp, Fp whose mode dispersions $\Delta\tau$ were substantially constant. The mode dispersion $\Delta\tau$ of each optical fiber was as shown in (a) of FIG. 14.

In Example 6, a ratio of Lp (fiber length of optical fiber Fp) to Ln (fiber length of optical fiber Fn) was set to have Lp:Ln=0.645:0.355 so that the mode dispersion $\Delta\tau$ in the light transmission path F was 0 in a case where λ was 1580 nm (the mode dispersion of the optical fiber Fp was $\Delta\tau$=295.0 ps/km, and the mode dispersion of the optical fiber Fn was $\Delta\tau$=−532.2 ps/km), and the mode dispersion characteristic in the light transmission path F was calculated.

As shown in (b) of FIG. 14, it was confirmed that, in the light transmission path F of Example 6, the mode dispersion $\Delta\tau$ was −2 ps/km to 2 ps/km, i.e., was extremely small in the band of 1530 nm to 1625 nm, and an influence of the wavelength $\lambda$ on the mode dispersion $\Delta\tau$ was extremely small. Therefore, it was confirmed that the optical fiber 1 of Example 5 could satisfactorily compensate the mode dispersion in the whole band of 1530 nm to 1625 nm.

Comparative Example 1

The following description will discuss a comparative example of the optical fiber 1 in accordance with this embodiment with reference to FIG. 15 to FIG. 17. FIG. 15 shows set values of parameters defining a refractive index distribution of the optical fiber of this comparison example. FIG. 16 is a graph showing the mode dispersion characteristic of the optical fiber in accordance with this comparison example.

In this comparison example, an optical fiber having no trench and an optical fiber having a trench were used. As shown in FIG. 15, the optical fiber having no trench was set to have $\alpha$=1.8 and $\Delta$+=0.35. The optical fiber having a trench was set to have Ra=0.8, Rd=1.0, $\alpha$=1.8, and $\Delta$+=0.35.

As a result, as shown in (a) of FIG. 16, the optical fiber having no trench had a mode dispersion $\Delta\tau$ of −600 ps/km to −460 ps/km in the band of 1530 nm to 1625 nm, and a gradient $d\Delta\tau/d\lambda$ the mode dispersion $\Delta\tau$ with respect to a wavelength $\lambda$ was |1.7| ps/km/nm or less, which was larger than those of the optical fibers 1 of Examples.

As shown in (b) of FIG. 16, the optical fiber having a trench had the mode dispersion $\Delta\tau$ of 305 ps/km to 385 ps/km in the band of 1530 nm to 1625 nm, and the gradient $d\Delta\tau/d\lambda$ of the mode dispersion $\Delta\tau$ with respect to the wavelength $\lambda$ was |0.8| ps/km/nm or less, which was larger than those of the optical fibers 1 of Examples.

The following description will discuss an influence of change in core radius on a mode dispersion characteristic of the optical fiber of this comparison example with reference to FIG. 17. FIG. 17 is a graph showing a relationship between a change amount of a core radius and the mode dispersion characteristic of the optical fiber in accordance with this comparison example.

As shown in (a) of FIG. 17, it was confirmed that, in the optical fiber having no trench, a gradient of the mode dispersion $\Delta\tau$ with respect to the core radius was |190| ps/km/μm or less, and an influence of change in core diameter on the mode dispersion was larger than those of the optical fibers 1 of Examples.

As shown in (b) of FIG. 17, it was confirmed that, in the optical fiber having a trench, a gradient of the mode dispersion $\Delta\tau$ with respect to the core radius was |80| ps/km/μm or less, and the influence of change in core diameter on the mode dispersion was larger than those in the optical fiber 1 of each Example.

[Supplementary Information]

The present invention is not limited to the description of the embodiments above, and can be modified in numerous ways by a skilled person as long as such modification falls within the scope of the claims. An embodiment derived from a proper combination of technical means disclosed in different embodiments is also encompassed in the technical scope of the present invention.

Note that, in each embodiment described above, a wavelength band in which a mode dispersion is to be compensated is set to the band of 1530 nm to 1625 nm, however, the wavelength band is not limited thereto. As is clear from the description of the specification, a person skilled in the art the present invention can understand that mode dispersions in other wavelength bands can be compensated.

[Summary]

As described above, an optical fiber according to an embodiment of the present invention is a two-mode optical fiber for propagating an LP01 mode component and an LP11 mode component included in signal light, wherein a mode dispersion $\Delta\tau$ defined by the above mathematical formula (2) is constant in a predetermined wavelength band. In the above mathematical formula (2), vg11 represents a group velocity of the LP11 mode component and vg01 represents a group velocity of the LP01 mode component.

In particular, in the optical fiber, in the predetermined wavelength band, a gradient $d\Delta\tau/d\lambda$ of the mode dispersion $\Delta\tau$ with respect to a wavelength $\lambda$ is |0.5| ps/km/nm or less. In particular, in a case where the predetermined wavelength band is 1530 nm to 1625 nm, the gradient $d\Delta\tau/d\lambda$ of the mode dispersion $\Delta\tau$ with respect to the wavelength $\lambda$ is |0.5| ps/km/nm or less.

According to the above optical fiber, since change in mode dispersion characteristic caused by the wavelength $\lambda$ is hardly caused, it is possible to achieve a light transmission path in which a mode dispersion is compensated in a wide wavelength band by (i) configuring a first optical fiber having a positive mode dispersion characteristic and a second optical fiber having a negative mode dispersion characteristic in the same way as the above optical fiber and (ii) combining the first optical fiber and the second optical fiber each of which has an appropriate length. In particular, as is clear from the results of the experiments disclosed in the specification, by using the optical fiber, it is possible to achieve a light transmission path in which a mode dispersion is compensated in the whole band of 1530 nm to 1625 nm which is a communication wavelength band (however, the wavelength band is not limited thereto), and therefore, it is understood that the optical fiber is more useful.

In the optical fiber, it is preferable to include an inner core having an $\alpha$th-power-type refractive index distribution and a maximum refractive index of n1; an outer core surrounding the inner core and having a refractive index of n1'; and a clad surrounding the outer core and having a refractive index of n2 (n1'<n2<n1). In particular, it is preferable that the optical fiber satisfy the following three conditions where: a radius of the inner core is set to r1; a radius of an outer circumference of the outer core is set to a; a relative refractive index difference between the outer core and the clad is set to $\Delta$−; a relative refractive index difference between the inner core and the clad is set to $\Delta$+; Ra=r1/a; and Rd=|$\Delta$−|/|$\Delta$+|.

Ra≤0.7 (Condition 1):

0.1<Rd<0.5 (Condition 2):

1.0≤$\alpha$≤10.0 (Condition 3):

According to the optical fiber, by adjusting the parameters as appropriate, it is possible to more surely obtain a mode dispersion characteristic in which the gradient $d\Delta\tau/d\lambda$ or $d\Delta\tau/da$ of the mode dispersion $\Delta\tau$ with respect to the wavelength $\lambda$ or the core radius a is extremely small, i.e., a mode dispersion characteristic in which an influence of the wavelength $\lambda$ and the core diameter is extremely small.

A light transmission path according to an embodiment of the present invention includes a first optical fiber which is the optical fiber and has a positive mode dispersion $\Delta\tau$; and a second optical fiber which is the optical fiber and has a negative mode dispersion $\Delta\tau$.

According to this light transmission path, it is possible to achieve a light transmission path capable of satisfactorily compensate a mode dispersion in a whole desired wavelength band.

INDUSTRIAL APPLICABILITY

The present invention is applicable to a light transmission path for communication, and, in particular, can be suitably used for/as a light transmission path for communication in which wavelength division multiplexing or mode division multiplexing is used.

REFERENCE SIGNS LIST

F Light transmission path
Fp Optical fiber (first optical fiber)
Fn Optical fiber (second optical fiber)
1 Optical fiber
11 Core
111 Inner core
112 Outer core
12 Clad

The invention claimed is:

1. A two-mode optical fiber for propagating an LP01 mode and an LP11 mode which are components of a signal light,
said two-mode optical fiber comprising:
an inner core having an αth-power-type refractive index distribution and a maximum refractive index of n1;
an outer core surrounding the inner core and having a refractive index of n1'; and
a clad surrounding the outer core and having a refractive index of n2 (n1'<n2<n1),
wherein a mode dispersion $\Delta\tau$ defined by the following mathematical formula (2) is constant in a predetermined wavelength band:

$$\Delta\tau = \frac{1}{v_g 11} - \frac{1}{v_g 01} \tag{2}$$

wherein vg11 represents a group velocity of the LP11 mode component and vg01 represents a group velocity of the LP01 mode component,
said two-mode optical fiber satisfying the following three conditions 1 to 3:

Ra≤0.7; (Condition 1)

0.1≤Rd≤0.5; and (Condition 2):

1.0≤α≤10.0, (Condition 3):

where:
a radius of the inner core is set to r1;
a radius of an outer circumference of the outer core is set to a;
a relative refractive index difference between the outer core and the clad is set to Δ−;
a relative refractive index difference between the inner core and the clad is set to Δ+,
Ra=r1/a; and
Rd=|Δ−|/|Δ+|.

2. The two-mode optical fiber as set forth in claim 1, wherein, in the predetermined wavelength band, a gradient d$\Delta\tau$/dλ of the mode dispersion $\Delta\tau$ with respect to a wavelength λ is |0.5| ps/km/nm or less.

3. The two-mode optical fiber as set forth in claim 2, wherein, in a case where the predetermined wavelength band is 1530 nm to 1625 nm, the gradient d$\Delta\tau$/dλ of the mode dispersion $\Delta\tau$ with respect to the wavelength λ is |0.5| ps/km/nm or less.

4. A light transmission path, comprising:
a first optical fiber which is the two-mode optical fiber as recited in claim 1 and has a positive mode dispersion $\Delta\tau$; and
a second optical fiber which is the two-mode optical fiber as recited in claim 1 and has a negative mode dispersion $\Delta\tau$.

* * * * *